(12) United States Patent
Fernie et al.

(10) Patent No.: US 6,209,670 B1
(45) Date of Patent: Apr. 3, 2001

(54) CLUTCH FOR MULTI-DIRECTIONAL TRANSPORTATION DEVICE

(75) Inventors: Geoffrey R. Fernie, Islington; Gerald T. Griggs, Scarborough, both of (CA)

(73) Assignee: Sunnybrook & Women's College Health Science Centre, North York (CA)

( * ) Notice: Subject to any disclaimer, the term of this patent is extended or adjusted under 35 U.S.C. 154(b) by 0 days.

(21) Appl. No.: 09/192,230

(22) Filed: Nov. 16, 1998

(51) Int. Cl.$^7$ .................................................. B62D 1/00
(52) U.S. Cl. ........................... 180/12; 180/11; 180/6.5; 280/755
(58) Field of Search ................... 180/11, 12, 23, 180/24, 65.1, 65.6, DIG. 907, 6.5; 280/755

(56) References Cited

U.S. PATENT DOCUMENTS

| | | | |
|---|---|---|---|
| 4,221,273 | * | 9/1980 | Finden ................................ 180/6.48 |
| 4,274,503 | * | 6/1981 | Mackintosh ............................ 180/23 |
| 4,403,673 | * | 9/1983 | Ball ..................................... 180/214 |
| 5,121,806 | * | 6/1992 | Johnson ............................... 180/65.5 |
| 5,183,133 | * | 2/1993 | Roy et al. ............................ 180/252 |
| 5,248,007 | * | 9/1993 | Watkins et al. ..................... 180/9.32 |
| 5,249,636 | * | 10/1993 | Kruse et al. ............................ 180/21 |
| 5,445,233 | * | 8/1995 | Fernie et al. ........................... 180/6.5 |
| 5,525,901 | * | 6/1996 | Clymer et al. .................. 324/207.21 |
| 5,773,947 | * | 6/1998 | Torii et al. ............................ 318/466 |
| 5,955,972 | * | 9/1999 | Wade .................................. 340/960 |
| 5,984,829 | * | 11/1999 | Minagawa et al. .................... 477/98 |

* cited by examiner

*Primary Examiner*—J. J. Swann
*Assistant Examiner*—J. Allen Shriver
(74) *Attorney, Agent, or Firm*—Philip C. Mendes da Costa; Bereskin & Parr

(57) ABSTRACT

A clutch for altering the direction of a drive unit of a transportation device between a first direction of travel and a second direction of travel, the drive unit having at least one drive wheel connected to a shaft, the shaft being rotatably mounted with respect to the transportation device between at least a first position, corresponding to the first direction of travel, and a second position, corresponding to the second direction of travel, the clutch comprises a housing to receive a portion of the shaft, a lock having a first preset locked position corresponding to the first direction of travel and a second preset locked position corresponding to the second direction of travel and, a connecting member connected to the shaft and the lock for alternately locking the shaft in one of the directions of travel.

27 Claims, 12 Drawing Sheets

CLUTCH FOR MULTI-DIRECTIONAL TRANSPORTATION DEVICE

FIELD OF THE INVENTION

The present invention relates to a clutch mechanism and clutch controller for a transportation device, such as a wheelchair, stretcher, or the like. In particular, the present invention relates to a clutch for controlling the rotational movement of a drive unit for such a device from a first position (eg. a forward drive position) to a second position (eg. a sideways drive position).

BACKGROUND OF THE INVENTION

Traditionally, powered wheelchairs have two drive wheels at the rear and two castor wheels at the front. Each of these drive wheels may be driven by its own motor and, by driving the drive wheels at different speeds, the chair can be turned. These chairs drive like a car in that they pivot about the rear of the chair (in a similar manner to the way a car pivots about its rear wheels). Accordingly, such motorized wheelchairs are generally adapted for movement either along a straight line or along a steered curved arc, somewhat in the same manner as an automobile. They require a significant turning radius and, as with a car, many manoeuvres must be executed backwards. Further, these chairs tend to lose traction on downward slopes since the rear drive wheels tend to become unloaded.

If it is desired to realign the wheelchair for movement in a new direction, it is typically necessary to go through complex turning manoeuvres, somewhat similar to the three point turn utilized on occasion in operating an automobile. The manoeuvres require a significant amount of space and many tight spaces must be approached backwards in a manner similar to a car reversing into a parking spot. These complex manoeuvres are tiresome and often difficult for disabled persons to carry out. While there are some powered chairs where the powered drive wheels are at the front, these chairs also require a large turning radius.

Several wheelchairs have been designed with the drive wheels positioned near the centre of the chair. Generally, these chairs, which are known as mid-wheel drive chairs, operate with the two drive wheels and either a front pair or a rear pair of wheels in contact with the ground. Thus for stability, the drive wheels must be positioned either in front of or behind the centre of gravity of the chair so that the chair is balanced on the drive wheels and either the front wheels or the rear wheels. The other pair of wheels act as anti-tippers to prevent the chair from tipping over on slopes, or during acceleration or deceleration. These anti-tipping wheels are generally held above the surface and are not in contact with the ground. These mid-wheel drive chairs are garnering a reputation as being unstable since, in operation, the chairs lurch considerably as the chair tips onto its anti-tipping wheels. Stability is improved by moving the drive wheels farther away from the centre of gravity of the chair. At the same time, however, the manoeuvrability of the chair decreases as the drive wheels are placed farther away from the centre of gravity of the chair, since the rotation no longer takes place at the centre of the chair (i.e. at the centre of gravity).

In U.S. Pat. No. 5,445,233 (Fernie et al.), the applicants disclosed a novel mid-wheel design for a motorized wheelchair, with the drive wheels directly underneath the chair's centre of gravity. This wheelchair utilized a pair of drive wheels which were centrally mounted beneath the seat of the chair and four free running stabilizing (caster) wheels which were positioned at each of the four corners of the base of the chair. In order to stabilize the chair so as to travel over uneven surfaces, the drive wheels were rotatably mounted on a shaft at a fixed position beneath the seat of the chair. The free running wheels were mounted on a collar so as to be vertically movably mounted on the shaft. The free running wheels were urged into contact with the ground via a spring mounted around the shaft. Accordingly, for example, if the wheelchair of Fernie et al were travelling in a forward direction and encountered uneven terrain, the front wheels could pivot upwardly or downwardly about the shaft while ensuring that the drive wheels remained in contact with the ground. The spring would continually urge the free running wheels into engagement with the ground to stabilize the wheelchair and thereby prevent the wheelchair from tipping over.

The motorized mid-wheel wheelchair design disclosed by the applicants in U.S. Pat. No. 5,445,233 could be operated from a standing start in any desired direction without the necessity of a series of forward and reverse movements. By driving the motors of the two drive wheels in opposite directions (at the same speed) the drive unit could be rotated to face a desired direction, for instance the direction indicated by a joystick, and then operated to move from a standing start in that direction. During the rotation of the drive unit the clutch could be disengaged so that the orientation of the chair does not change (alternatively the clutch could remain engaged so that the chair rotates with the drive unit). This patent did not disclose a clutch design.

While the ability to move the chair in any desired direction seems beneficial, in work conducted by the applicant, this has proven not to be the case. Human beings tend to think and operate along Cartesian coordinates. Accordingly, when they are seated in a chair, they have trouble controlling diagonal motion. Thus the ability to permit the chair to rotate to any desired angle provides little or no advantage to a person operating a chair, and adds considerably to the complexity of the clutch mechanism. These clutch complexities further require additional parts which are subject to wear and tear and potential failure. These additional parts also add substantially to the cost of the wheelchair, thereby restricting the ability of some disabled people to acquire the wheelchair.

SUMMARY OF THE INVENTION

In accordance with this invention, there is provided a clutch for altering the direction of a drive unit of a transportation device between a first direction of travel and a second direction of travel, the drive unit having at least one drive wheel connected to a shaft, the shaft being rotatably mounted with respect to the transportation device between at least a first position, corresponding to the first direction of travel, and a second position, corresponding to the second direction of travel, the clutch comprising:

(a) a housing to receive a portion of the shaft;
(b) a lock having a first preset locked position corresponding to the first direction of travel and a second preset locked position corresponding to the second direction of travel; and,
(c) a connecting member connected to the shaft and the lock for alternately locking the shaft in one of the directions of travel.

In one embodiment, the shaft extends vertically and the housing is adapted to rotatably receive a portion of the shaft therein.

In another embodiment, the connecting member is drivenly connected to the shaft whereby rotation of the shaft between the first and second directions of travel when the lock is not lockingly engaged in one of the preset locked positions causes the lock to move between the first and second locked positions.

In another embodiment, the clutch further comprises an actuator for disengaging the lock from the first and the second locked positions.

In another embodiment, the rotation of the shaft between the first and second positions comprises an initial segment of travel and a final segment of travel and the clutch further comprises a detector for detecting the degree of rotation of the shaft between the first and second positions and a controller for reducing the rate of rotation of the shaft during the final segment of travel of the shaft between the first and second positions.

In accordance with another embodiment of this invention, there is provided a base for receiving a support surface comprising:

(a) a longitudinally extending chassis having a front end, a rear end and a central portion positioned therebetween;
(b) at least one drive wheel mounted on the central portion to engage the surface on which the base is positioned;
(c) a plurality of rotatably mounted wheels positioned around the chassis and mounted below the chassis to engage the surface on which the base is positioned; and,
(d) a clutch operable to selectively lock the at least one drive wheel in at least a first preset position corresponding to a first direction of travel and a second preset position corresponding to a second direction of travel.

The base may further comprise a lock having a first preset locked position corresponding to the first direction of travel and a second preset locked position corresponding to the second direction of travel, and a connecting member connected to the shaft and the lock for alternately locking the shaft in one of the directions of travel. Further, the base may have at least two drive wheels with the connecting member being drivenly connected to the shaft whereby rotation of the drive wheels in opposed directions when the lock is not locked in one of the preset locked positions causes the drive wheels to move between the first and second directions of travel.

In one embodiment, the clutch may further comprise an actuator for automatically engaging and disengaging the lock from the preset locked positions as the at least one drive wheel moves between the first and second directions of travel.

In another embodiment, the first direction of travel is forwards and the seconds direction of travel is sideways and the base includes a controller for limiting the speed of the base when the drive wheels are in the second direction of travel.

In another embodiment, the first direction of travel is forwards and the second direction of travel is sideways and the base further comprises a tilt sensor for detecting the degree of rotation of the base from the horizontal and a limiter to prevent the drive wheels moving to the second position or to prevent the at least one drive wheel from moving the base when the tilt sensor detects an angle greater than a preset angle.

The connector member may comprise a first arm and the lock may comprise a cam member and a second arm non-rotatably mounted to the cam member and the first and second arms are pivotally connected together. The base may further comprise a link member pivotally connected to both the first arm and the second arm and, when the lock is in the first and the second preset locked positions, the first arm and the link extend in a substantially straight line.

In one embodiment, the cam member comprises a first engagement member corresponding to each of the preset locked positions and the lock comprises a second engagement member lockingly engagable with each of the first engagement members, the second engagement member moveable out of engagement with each first engagement member essentially without any frictional contact between the second engagement member and the cam member. The clutch may further comprise a solenoid for moving the second engagement member out of engagement with the first engagement members. The clutch may further comprise a biasing member for biasing the second engagement member into engagement with the first engagement member.

In one embodiment, the clutch may further comprise a joystick for actuating the movement of the at least one drive wheel between the first and second directions of travel.

In one embodiment, the clutch may further comprise a indicator for indicating engagement of the lock in a preset locked position.

In accordance with another embodiment of this invention, there is provided a method for altering the direction of a drive unit of a transportation device between a first direction of travel and a second direction of travel, the drive unit having a clutch, at least one drive wheel connected and a shaft extending vertically between the at least one drive wheel and the clutch, the shaft being rotatably mounted with respect to the transportation device between a plurality of positions each corresponding to the different direction of travel, the clutch operable to selectively lock the at least one drive wheel in a preset locked position corresponding to a direction of travel, the method comprising:

(a) disengaging the clutch from a preset locked position;
(b) accelerating the shaft to rotate the shaft between a first position and a second position;
(c) decelerating the shaft prior to the shaft moving to the second position such that the termination of rotation of the shaft at the second position does not jar the transportation device; and,
(d) engaging the clutch in the respective preset locked position.

In one embodiment, the drive unit comprises at least two drive wheels and the method further comprises causing the drive wheels to rotate in opposite direction to rotate the shaft between the first and second positions.

In another embodiment, the method further comprises detecting the degree of rotation of the shaft when the shaft has rotated a preset amount between the first and second positions and decelerating the shaft once it has rotated the preset amount.

In another embodiment, the method further comprises detecting the completion of the rotation of the shaft between the first and second positions and signalling a user to confirm completion of the rotation of the shaft.

In another embodiment, the first direction of travel is forwards and the seconds direction of travel is sideways and the method further comprises limiting the speed of the base when the drive wheels are in the second direction of travel.

In another embodiment, the first direction of travel is forwards and the second direction of travel is sideways and the method further comprises detecting the degree of rotation of the base from the horizontal and preventing the drive wheels moving to the second position or preventing the at least one drive wheel from moving the base when the degree of rotation of the base from the horizontal is greater than a preset angle.

One advantage of the instant invention is that is provides a reliable and practacle method for controlling the rotation of centrally mounted drive wheels. The construction is of a simple design may be easily manufactured.

Another advantage of the instant invention is its ease of use. By having preset directions to which the drive wheels may be moved (eg. forwards and sideways), the user may change the direction of travel of, eg. a wheelchair, just by moving a joystick in the desired direction or even by pushing a key which is coded for that direction. Thus the wheelchair may be used by a disabled person even if that person does not have full motor control.

Another advantage of the instant invention is that by including a deceleration cycle in the rotational movement of the drive wheels, the drive wheels may be moved relatively quickly between two preset positions without jarring a person supported on a wheelchair or a stretcher or even equipment mounted on a moveable platform. This is particularly important if the equipment is sensitive to movement or, if the equipment is not properly secured to a platform, may be prone to falling if subjected to sudden movements.

BRIEF DESCRIPTION OF THE DRAWINGS

These and other advantages of the instant invention will be more fully and particularly understood in connection with the following description of a preferred embodiment of the invention in which.

DETAILED DESCRIPTION OF THE INVENTION

Figure 1:
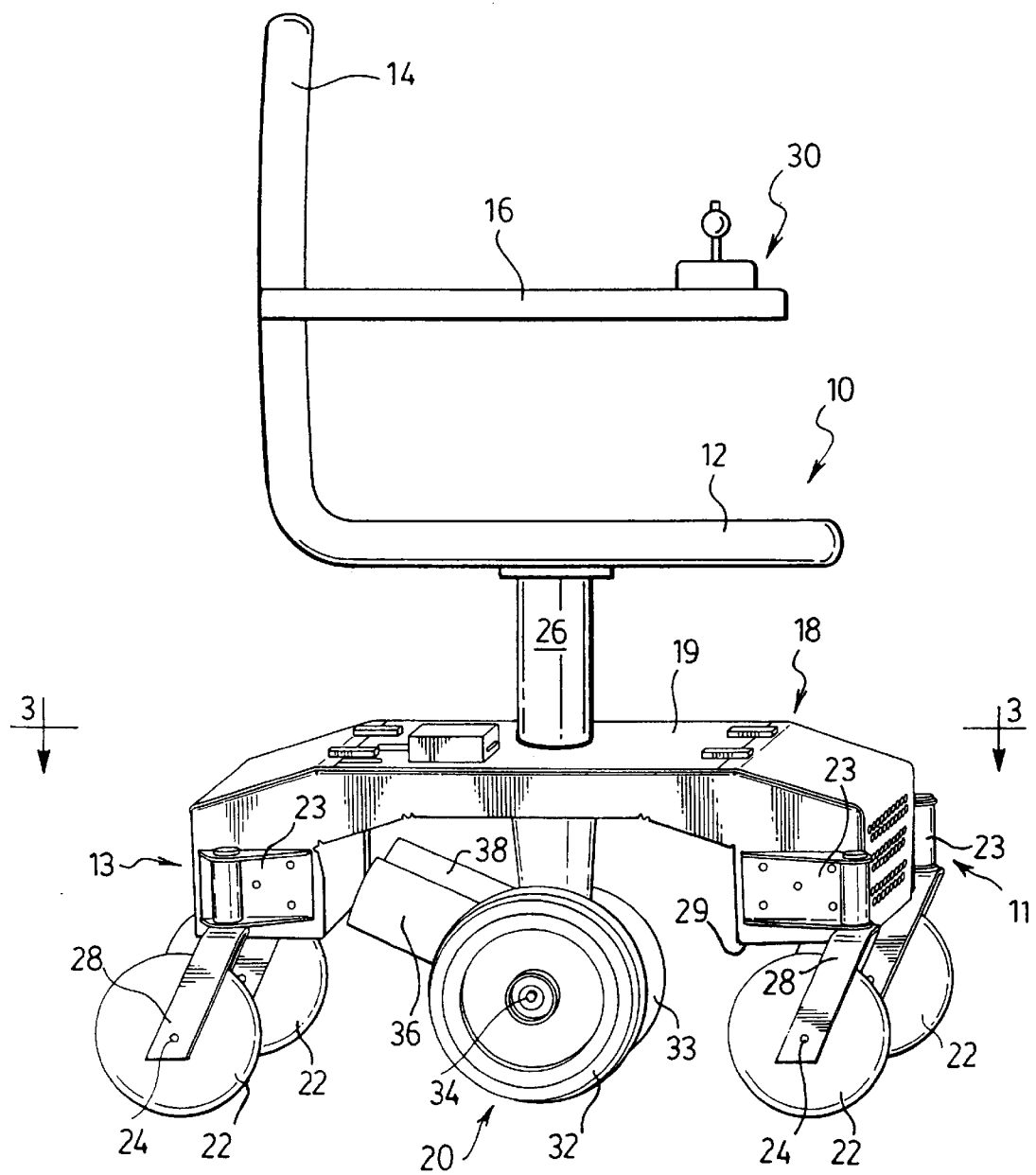
FIG. 1 is a side view of a transportation device illustrated as a wheelchair.

In FIG. 1, a transportation device 10 is shown in a side view as a motorized wheelchair comprising a seat 12, a back 14, a side arm 16 and a base 18.

Base 18 may be used in the manufacture of a motorized transport device, such as a wheelchair or to support a stretcher or any transportation device which supports a load. The following description is based on the use of base 18 for a wheelchair; however, it will be appreciated that base 18 may be modified to receive thereon the superstructure of a stretcher or other transportation device. Accordingly, seat 12 may be affixed to top surface 19 by any means known in the art. Preferably, the seat which is affixed to the chair is a seat for a wheelchair mounted, eg. on column 26 or bolted directly to base 18, so that, when assembled, the unit comprises a wheelchair. Motorized chair base 18 is particularly adapted for use in the industry as it may easily be adapted to receive any existing wheelchair seat or the like.

In the preferred embodiment, a plurality of rotatably mounted free running wheels 22 are positioned around the base and mounted at a fixed distance below the base. Free running wheel 22 are positioned so as to stabilize base 18 when a person is entering or exiting the wheelchair. A free running wheel is preferably provided adjacent each corner of base 18.

Free running wheels 22 may be fixed to base 18 by any means known in the art. They may be castor wheels. They may be affixed to base 18 by means of brackets 23. A pair of brackets 23 are preferably positioned on each opposed longitudinal side of base 18 and spaced apart so as to be adjacent front and rear ends 11, 13. Bracket 23 may have a vertically extending central portion which is positioned between upper and lower arms and is affixed to one of the sides by any means known in the art, such as by screws, rivets, welding or the like. A spacer may be affixed to the upper and lower arms and counterbored at each end to receive a bearing at each end. Free running wheels 22 may be rotatably mounted on axle 24. Axle 24 may be mounted in U shaped bracket 28 which is rotatably mounted on bracket 23.

It will be appreciated that more than four wheels 22 may be freely rotatably mounted to base 18. Further, it will be appreciated that each of the four wheels 22 may be positioned internal of the perimeter of base 18. For example, a recess (not shown) may be provided in bottom 29 for rotatably a bracket 23. It will be appreciated that any means known in the art may be used to rotatably mount wheels 22 to base 18.

A control unit 30 for controlling drive unit 20 is shown as a manually operable joystick located on the side arm 16, although other control mechanisms can also be employed. For example, a plurality of buttons at least some of which are programmed to direct the chair in a precoded direction may be provided. Alternately, the unit could be voice activated.

Figure 2:
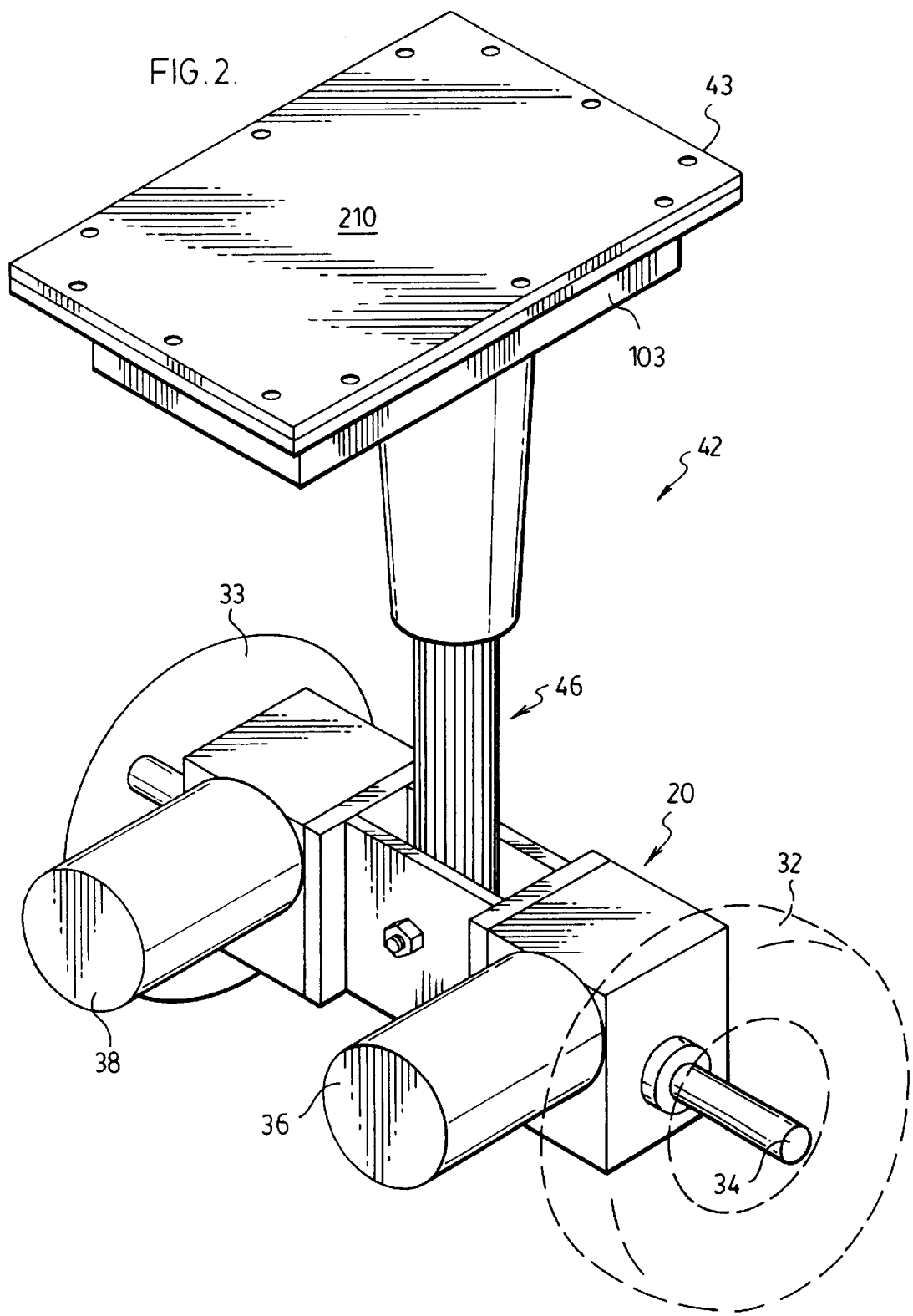
FIG. 2 is an enlargement of the drive mechanism of the wheelchair of FIG. 1.

The motorized drive unit 20 of device 10 is shown in more detail in FIG. 2. Note that although a motorized transportation device is preferable, the transportation device may also be driven by manual means (for example it may be pushed). Referring to FIG. 2, the drive unit 20 is shown to comprise two drive wheels 32 and 33 mounted on axle 34. Two separate drive motors 36, 38 may each be connected to a drive wheel 32, 33 respectively. The two motors 36 and 38 which are preferably electric motors are capable of being driven in either direction and are preferably controllable independently from one another. It will be appreciated that pursuant to the instant invention there is at least one wheel (wherein shaft 46 may be manually operable to rotate the drive wheel between the directions of travel) although two drive wheels are preferred.

Figure 3:
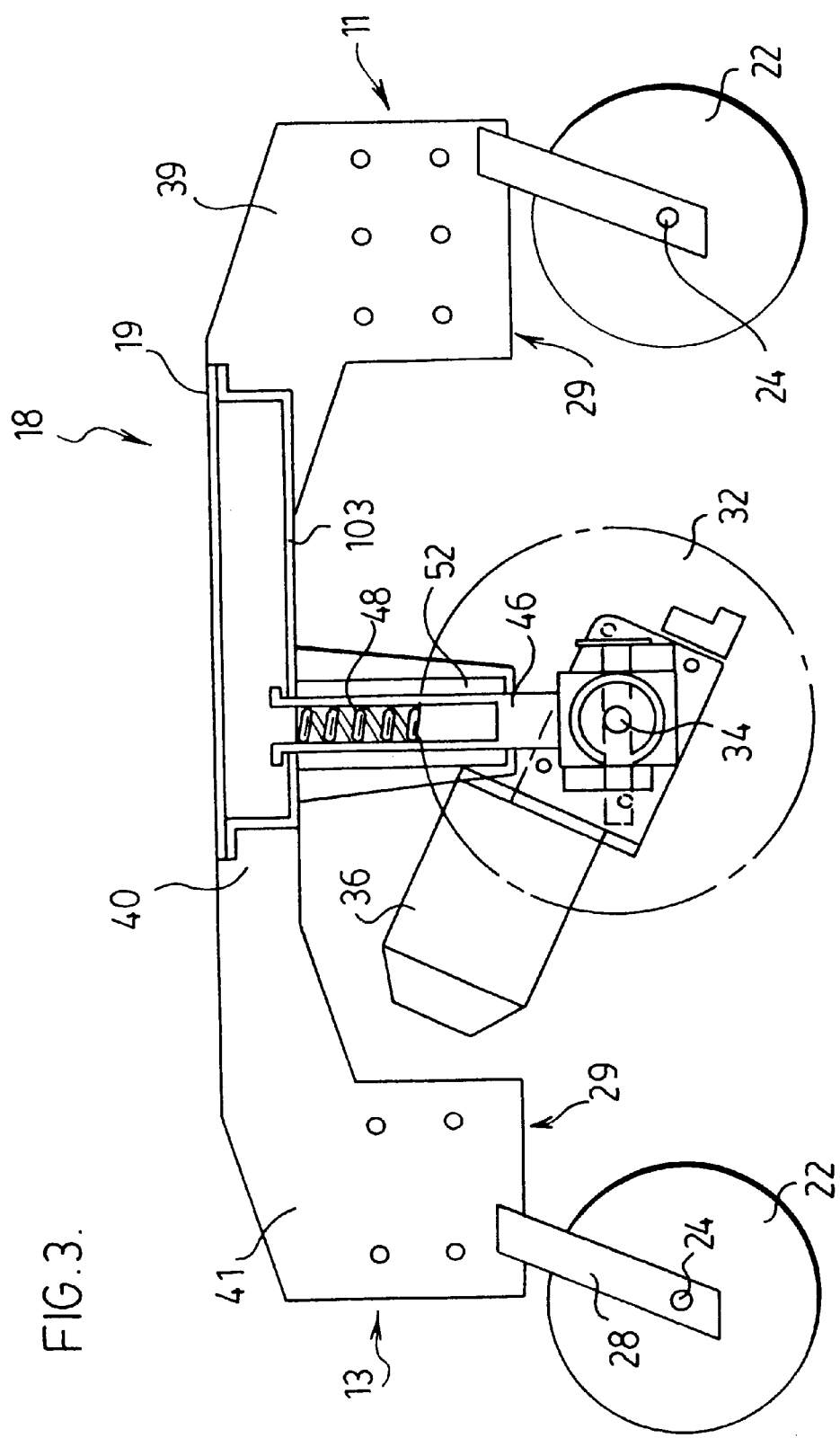
FIG. 3 is cross-section along the line 3—3 of the base of the wheelchair of FIG. 1.

Referring to FIG. 3, base 18 may have a forward compartment 39, central compartment 40 and rearward compartment 41. These compartments define sufficient storage space for the electronic motor controls for base 18 as well as the batteries to power the motor 36, 38. For example, in the preferred embodiment, one or more batteries may be positioned in forward compartment 39 and one or more batteries may be positioned in rearward compartment 41.

Tractor 42, which is shown in FIG. 2, is mounted in base 18 as shown in FIG. 3. Accordingly, the drive wheels 32, 33 are positioned centrally on base 18 between front and rear ends 11, 13 and effectively immediately below the person when seated in seat 12.

The support shaft 46 for drive wheels 32, 33 extends downwardly from upper housing 43 and is rotatably mounted therein. Drive wheels 32, 33 are mounted below housing 43 and are preferably biased so as to maintain their engagement with the ground upon which base 18 is positioned. In the preferred embodiment, wheels 32, 33 are mounted on a telescoping shaft which is biased, such as by a spring 48, to engage the ground. It will be appreciated that other suspension means for biasing wheels 32, 33 into the ground engaging position shown in FIG. 1 may be utilized, including, eg., biased struts or suspension arms.

Drive wheels 32, 33 are preferably biased so as to receive a substantial portion of the weight of an occupied chair when it is mounted onto base 18. For example, the weight of base 18, including batteries, motors 36, 38 and a chair mounted on base 18 may be in the order of about 100 kilograms. A substantial portion of this weight is supported by drive wheels 32, 33. In the preferred embodiment, drive wheels 32, 33 may support 75% of this weight, preferably more than 85% of this weight, more preferably than 90% of this weight, and most preferably, about 95% of this weight. It will thus be seen that free running wheels 22 do not support very much weight of an unoccupied chair but are in engagement with the ground. When a person is seated in the chair, due to the biasing member, the weight of the person will be distributed, preferably evenly, amongst free running wheels 22. Due to compression of the free running wheels, some this weight may be supported by drive wheels 32, 33. However, the amount of the weight of the person which is supported by drive wheels 32, 33 may be minimal (eg. in the order of 5% to 10% or less). Any of this weight which is supported by the drive wheels would be beneficial as it would increase the traction between drive wells 32, 33 and the ground.

In order to rotate the drive wheels, 32, 33 between a first direction of travel (eg. forwards) and a second direction of travel (eg. sideways), a clutch 54 is provided to selectively lock the drive wheels 32, 33 in a preset locked position corresponding to a direction of travel. It will be appreciated that the configuration of base 18 provided herein is exemplary and that alternate bases having at least one drive wheel mounted on a rotatable shaft 46 may be employed.

Although drive unit 20 preferably comprises two drive wheels, it may generally comprise any number of drive wheels alignable to produce movement of the device 10 in a fixed direction. Preferably a first set of drive wheels is controlled by a first motor and a second set of drive wheel is controlled by a second motor so that by driving each set of wheels in opposing directions, the device 10 can be made to rotate about its central axis (column 46).

When motors 36 and 38 are driven in the same direction, the drive unit 20 moves the device 10 in the direction in which the two wheels 32 and 33 are facing. In known manner, by speeding one of the motors 36 or 38 relative to the other motor, the device can be turned or steered away from the direction it is heading (i.e. the direction the wheels 32 and 33 are facing). Furthermore, in a preferred aspect of the invention, when the motors are driven in opposite directions, the wheels 32 and 33 rotate about column 46 and thus face a different direction.

If the clutch 54 is engaged such that shaft 46 is non-rotatably mounted in housing 43, then during the rotation of wheels 32 and 33, the transportation device 10 will similarly rotate in that direction, and thus the orientation of the device is redirected or changed. However in many circumstances it is desirable to be able to move the transportation in a different direction without changing the orientation of the device. For instance, in tight spaces it may not be possible to rotate the transportation device without encountering obstacles, but movement of the device in a desired direction (other than forward) is still possible. In other situations, it may be preferable to maintain the load (e.g. a human being in a wheelchair) in a specific orientation, but still move the device closer to a certain object (e.g. a refrigerator). In such cases, rotating the drive unit 20 without having to rotate the device 10 and then moving the device in the desired direction is also faster and simpler than first rotating the device 10, then moving forward in the desired direction, and then rotating the device 10 back to the desired orientation. In such cases, if the clutch 54 is disengaged such that shaft 46 is rotatably mounted in housing 43, then during the rotation of wheels 32 and 33, the transportation device 10 will not rotate. Instead the orientation of the drive unit 20 is redirected or changed.

Furthermore, it is apparent that while movement of the transportation device 10 in any direction with respect to the orientation of the device can be implemented, the present invention preferably restricts these movement to a fixed number of directions. In the preferred embodiment, the transportation device according to the present invention can be moved along either a forward/backward direction or a lateral/sideways direction with respect to the orientation of the device. By restricting movement of the transportation device to Cartesian or rectangular coordinates, the operation and control of the transportation device is greatly simplified from a human operator's perspective, with little or no degradation in manoeuvrability. If desired, other preset compass points may be utilized.

Figure 4:
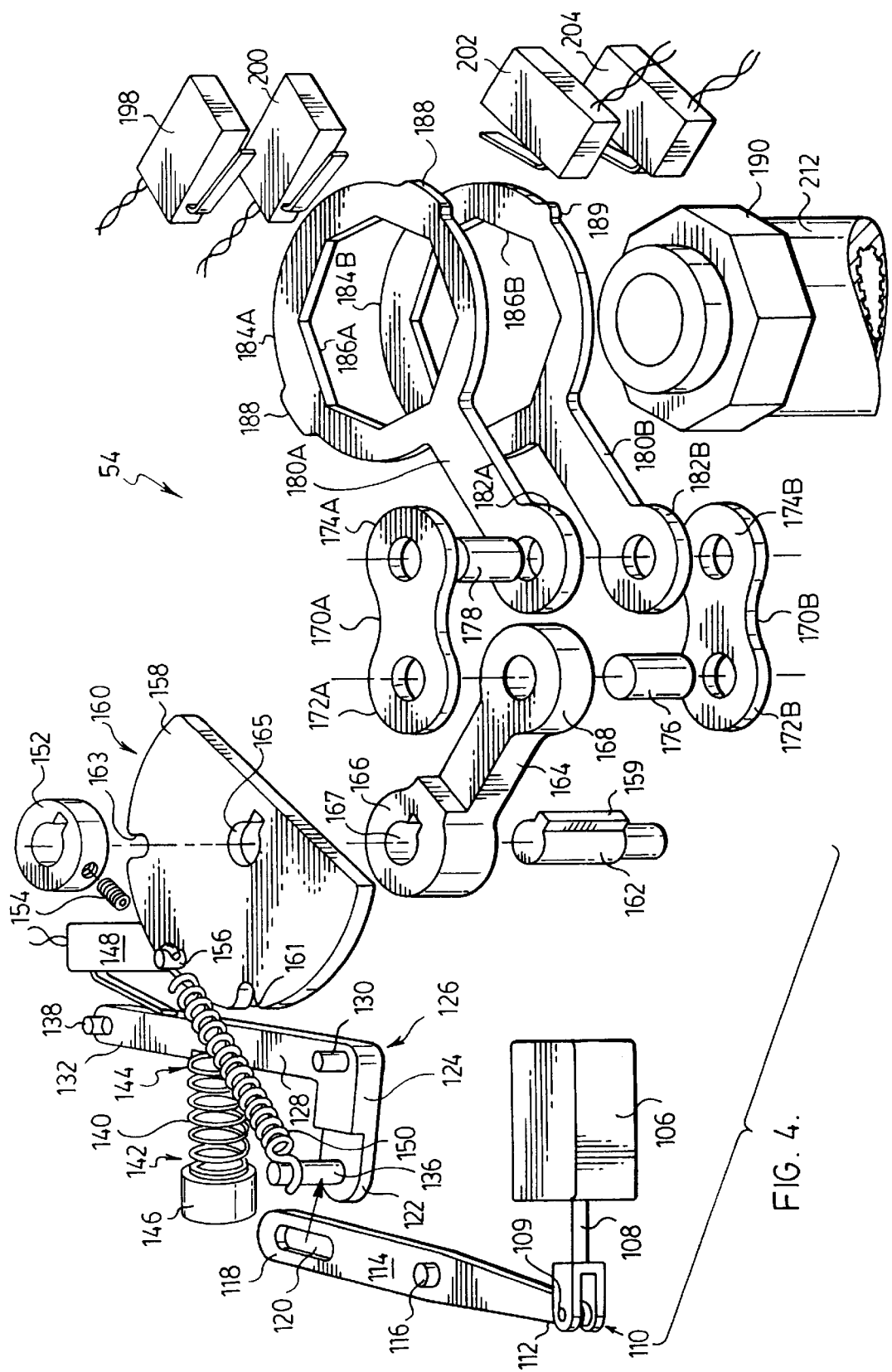
FIG. 4 is an exploded view of a clutch mechanism according to the present invention.

FIG. 4 shows an exploded view of the clutch mechanism 54 according to a preferred embodiment of the present invention. This clutch mechanism 54 allows the drive unit 20 to be either aligned with the forward orientation direction of the transportation device ("forwards mode") or alternatively aligned at an angle of 90° with the forward orientation direction of the transportation device ("sideways mode"). Note that the transportation device 10 is preferably also able to rotate about its central axis by operating the drive wheels of the device at equal speeds and in opposite directions with the clutch engaged.

Clutch mechanism 54 includes a housing 102 to receive a portion of the shaft, a lock having a first preset locked position corresponding to the first direction of travel and a second preset locked position corresponding to the second direction of travel and, a connecting member connected to the shaft and the lock for alternately locking the shaft in one of the directions of travel. In the preferred embodiment, the lock comprises mechanical members which mate to lockingly engage and prevent relative movement therebetween.

Figure 5:
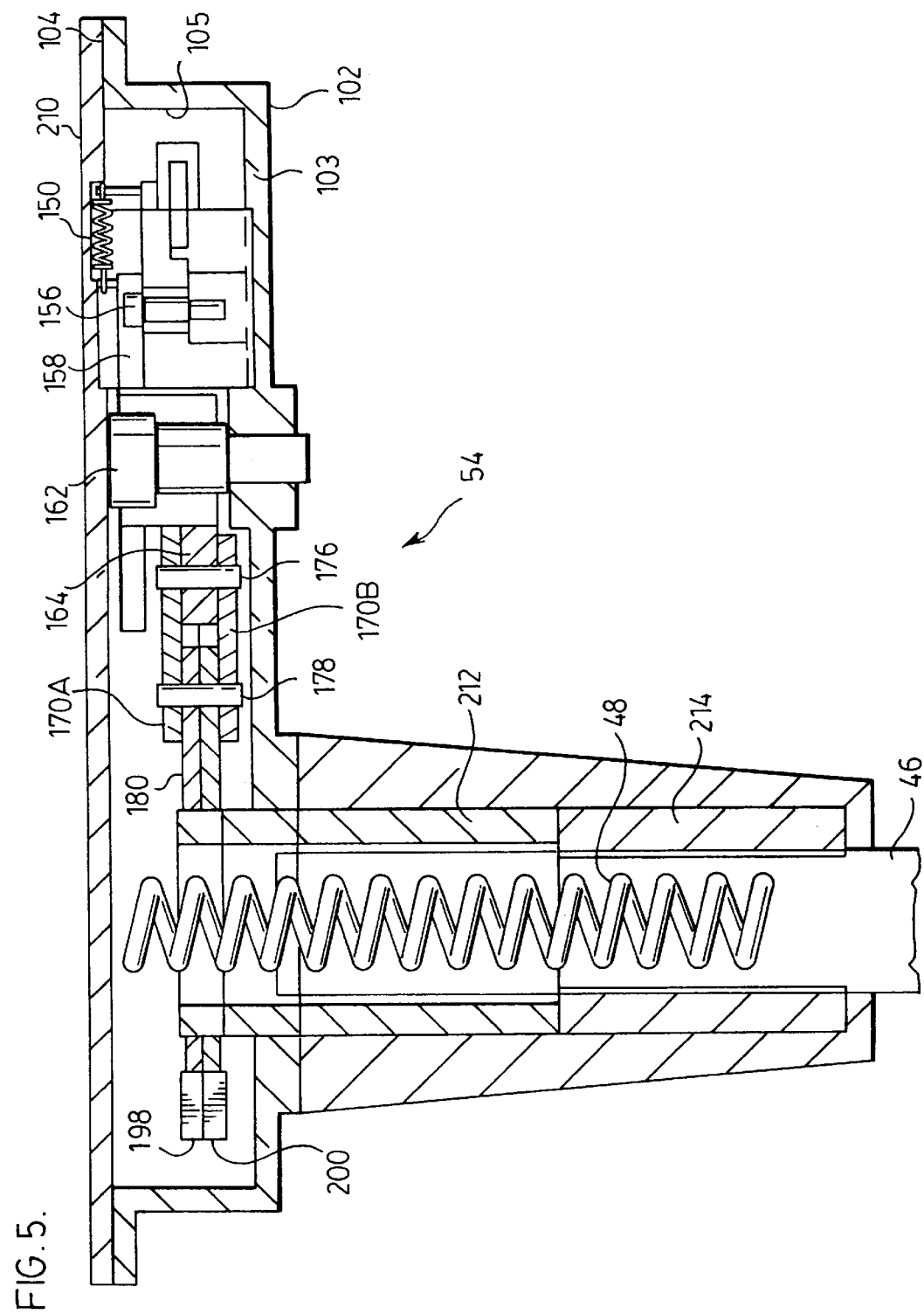
FIG. 5 is an enlarged cross-section along the line 3—3 of the clutch of the wheelchair of FIG. 1 showing the clutch of FIG. 4.

Referring to the preferred embodiment of FIGS. 4 and 5, clutch mechanism 54 is encased in a housing 102 having a base 103, a flanged border 104, and an internal housing wall 105 located between the base 103 and the border 104.

An actuator is provided for disengaging the lock from the preset positions. To this end, in the preferred embodiment, an actuator which is responsive to a controller for automatically disengaging the lock on receipt of a specified signal is used. This may comprise a solenoid and actuator arms are used to disengage the lock from a preset locked position. Accordingly, the clutch mechanism 54 comprises a solenoid 106 from which protrudes a solenoid rod 108. The rod 108 is fastened, by way of for example a clevis pin 109 at pivot point 110 to a first end 112 of rocker or solenoid arm 114. Rocker arm 114 includes a pivot 116 near its midway point where it is pivotally fastened to base 103 of housing 102. The other end 118 of rocker arm 114 is pivotally connected by pin or bolt 136 to the end 122 of a first arm 124 of a right-angled locking or latch lever 126. End 122 and pin 136 are moveable within a longitudinal slot 120 within end 118 of rocker arm 114. Locking lever 126 includes a second arm 128 which preferably orthogonally meets the first arm 124 at the base of lever 126, where a pawl pin 130 is located. The end 132 of arm 128 is connected to a locking arm pivot by means of pin or bolt 138 which pivotally fastens the end 132 of arm 128 to the base 103 of housing 102. However, it will be appreciated that other actuating mechanisms may be used.

Figure 6:
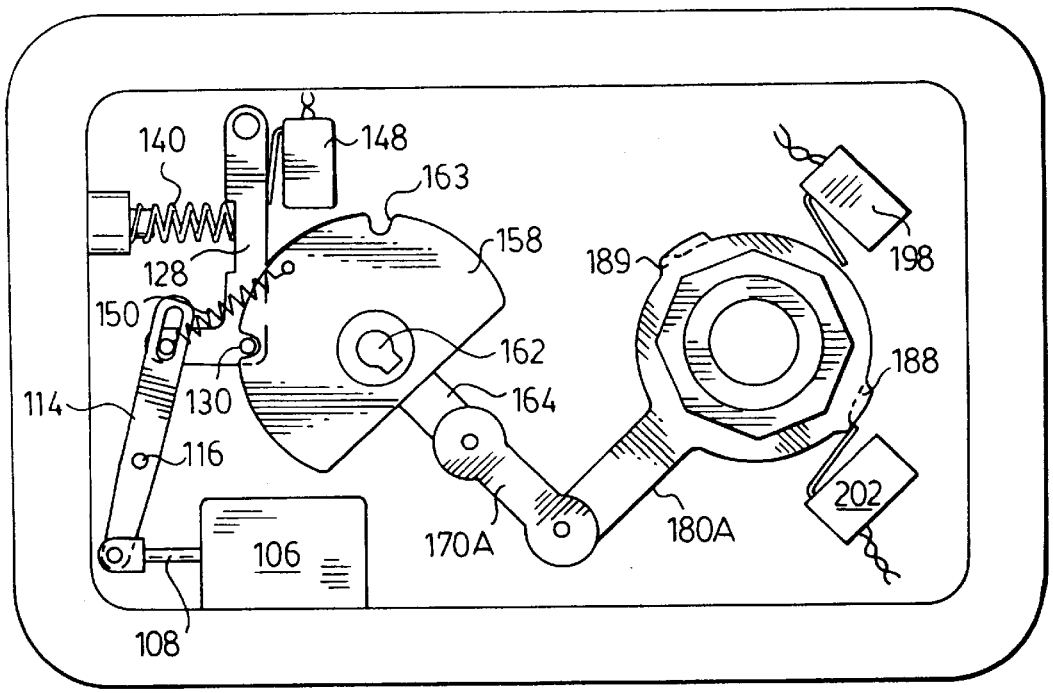
FIGS. 6–11 show the clutch of FIG. 4 at various stages as the clutch changes from forward mode to sideways mode.

The clutch also preferably includes an actuator for automatically engaging the lock in one of the preset positions as the drive wheels move to a preset direction of travel. Preferably, this is achieved by a biasing member. Referring again to the preferred embodiment of FIG. 4, a latch spring 140 has a first end 142 anchored to a base 146 and a second end 144 abutting against arm 128 of locking lever 126. The latch spring base 146 is affixed to the internal wall 105 of housing 102, as shown in FIG. 6. In addition, a bias spring 150 is connected to pin 136 at one end and is pivotally attached at the other end to a sector plate 158 of a latch cam 160 via a pin 156.

The sector plate 158 is rotatably fastened to the base 103 of housing 102 by means of a bolt 162, collar 152 and a set screw 154. Sector plate 158 contains two slots 161 and 163 which are 90° apart and are sized to receive the pawl pin 130. It will be noted that the pin or bolt 156 which attaches an end of the bias spring 150 to the sector plate 158 is symmetrically located at an angular position which is halfway between the slots 161 and 163. It is further understood that while the means for engaging the locking arm 126 and the latch cam 160 (sector plate 158) are shown as a pawl pin 130 and slots 161 and 163, any suitable mating engagement members for alternately engaging and disengaging so as to define a lock, and preferably a mechanical lock may be used. The sector plate 158 and the pawl pin 130 comprise the lock. The preset positions are determined by the position of slots 161 and 163. It will be appreciated that more than two slots 161, 163 may be provided if additional preset positions are desired.

The clutch 54 also includes a connecting member drivenly connected to the shaft whereby rotation of the shaft between the first and second directions of travel when the lock is not lockingly engaged in one of the preset locked positions causes the lock to move between the first and second locked positions. To this end, in the preferred embodiment, a linking member pivotally connected to the lock (the sector plate 158) and to a member non-rotatably connected to the shaft 46 is used. For example, a first end 166 (located underneath the sector plate 158) of a first arm 164 is non-rotatably mounted with respect to sector plate 158. This is preferably achieved by means of a spline 159 on bolt 162 which mates with a similarly shaped opening 167 in end 166 of link 164 and opening 165 in plate 158.

Referring once again to FIG. 4, the second end 168 of first arm 164 is pivotally connected to a first ends 172A,B of link members 170A,B by means of a pivot pin 176. The other ends 174A,B of the links 170A,B are pivotally connected to the respective narrow end 182A,B of a second arm 180A,B (by means of a pivot pin 178). Each link 180A,B is "racquet" shaped and has a circular position cam end 184A,B that preferably has an octagonally shaped interior edge 186A,B which mates with a splined bushing or bearing 190 having a similarly shaped exterior edge.

Shaft 46 is rotatably mounted in housing 43. In the preferred embodiment, this is achieved by means of bushing or bearing 190. The splined bushing 190 surrounds and mates with extension 212 which is also splined by spline 214 to be non-rotatably mounted on shaft 46 such that shaft 46 is non-rotatably mounted with respect to links 180A,B. Also, two pairs of mode identification switches 198–200 and 202–204 and a latch engagement switch 148 are preferably included in clutch 54.

While the clutch may comprise two second arms 180A and 180B placed one on top of the other and two links 170A,B, only a single crank 180 and link 170 may be used. In the preferred embodiment, second arms 180A and 180B are identical with the exception of the cam lobes 188 on link 180A and the cam lobes 189 on link 180B, whose function is explained below.

FIG. 5 is a cross-sectional view of the clutch mechanism of FIG. 4. Identically numbered reference labels refer to the same elements as in FIG. 4. In addition, the clutch housing includes a top plate 210 (within which bias spring 150 may be recessed), and an extension 212 for the splined shaft is shown.

FIG. 6 shows the clutch mechanism 54 engaged or locked in the forward (0°) mode. In this mode, pawl pin 130 is positioned firmly within slot 161 of sector plate 158 so that the angular position of the sector plate 158 is fixed. FIGS. 6–11 illustrate various stages of the clutch 54 as it disengages and changes from the forward mode to the sideways (90°) mode. In operation, as is understood by those skilled in the art, when the solenoid 106 is energized with an electrical current, the solenoid rod 108 contracts inwardly into the solenoid 106. This contraction causes the rocker arm 114 to rotate counter-clockwise (as viewed in FIG. 6) about the rocker arm pivot 116 and consequently also pulls the arm 128 of latch or locking lever 126 against the latch spring 140. As a result, the pawl pin 130 is withdrawn from the slot 161. One advantage of this design is that the pawl pin 130 moves effectively directly outwardly from slot 161 and accordingly there is little, if any, frictional contact between the locking elements. Thus, a single solenoid may be used to actuate the disengagement of the locking members.

It is understood that while the clutch 54 has been described in connection with a motorized transportation device and is preferably energized by a solenoid, it is also possible for the rocker arm 114 to be actuated by purely mechanical means such as a lever or the like. Generally for non-motorized transportation devices 10, both the actuating means for changing clutch modes and the means for rotating the drive unit of the device may be mechanically controlled.

Figure 7:
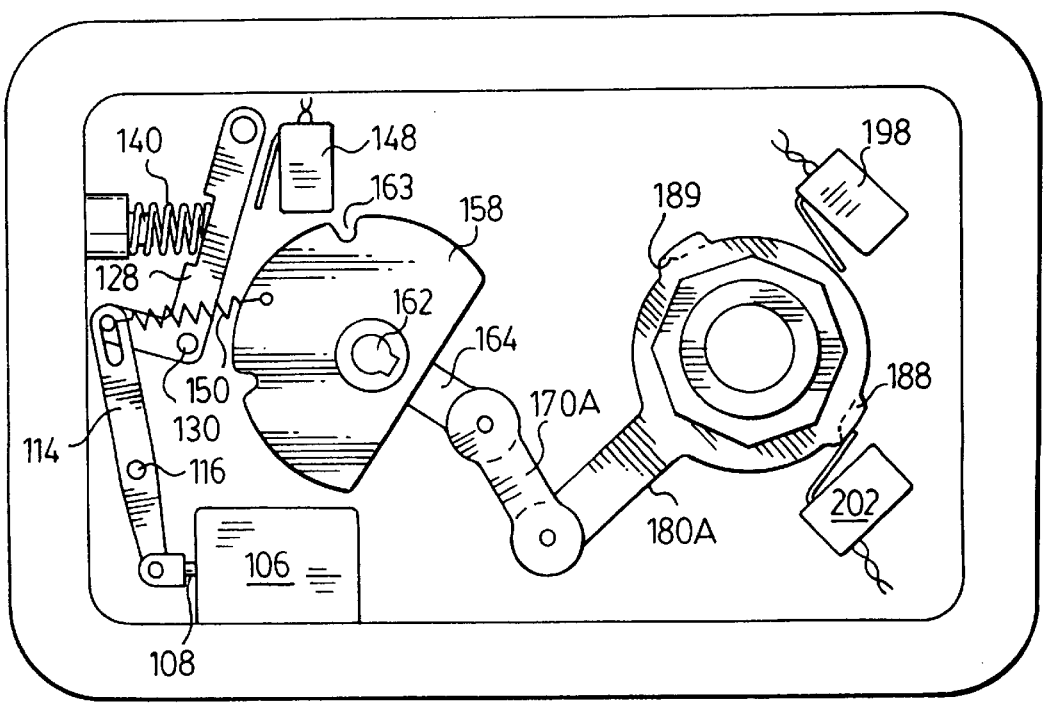

FIG. 7 shows the stage at which the solenoid rod 108 is fully contracted. Between the stages shown in FIGS. 6 and 7, the tension of the bias spring 150 increases sufficiently to provide the initial motion for the latch cam 160 (including sector plate 158) to move the links 164 and 170 out of their "top dead centre" in-line position. One advantage with this implementation is that this movement of the links 164 and 170 requires very little force as there are no forces to oppose it. In addition, the length and the positioning of the biasing spring 150 can be chosen to ensure that virtually all of the mechanical energy provided by the solenoid 106 during the first half of the contraction of the rod 108 is used to pull the pawl pin 130 out of the slot 161. As such, the movement of the solenoid rod 108 only begins to pull significantly on the spring 150 during the latter part of its contraction, when the pin 130 is already clear of the slot 161 and when the solenoid is at its strongest.

As will be described in further detail below, when the control circuitry electrically energizes the solenoid 106, it also commands the motors 36 and 38 to operate the drive wheels 32, 33 in opposite directions and preferably with equal speeds so that the drive unit 20 can begin to rotate. As mentioned earlier, by driving the drive wheels in this manner, the transportation device 10 would normally spin about the column 46. However, because the clutch is now unlocked or disengaged, the drive unit 20 (which is attached to shaft 46) may rotate without rotating the transportation device 10.

Figure 8:
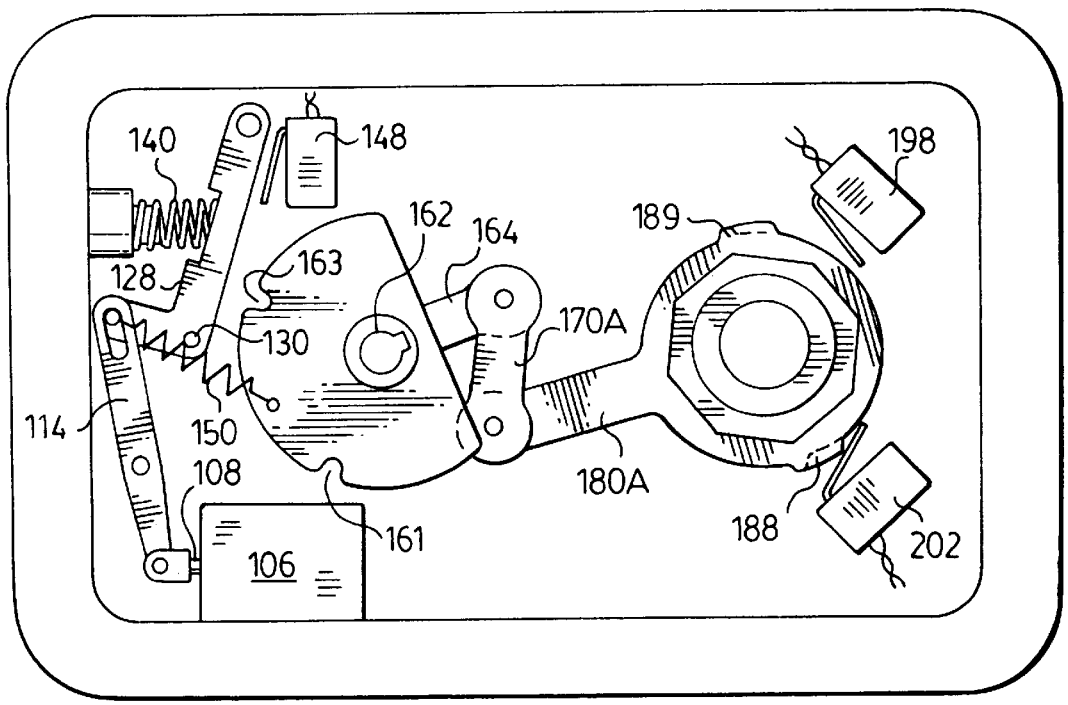
Figure 9:
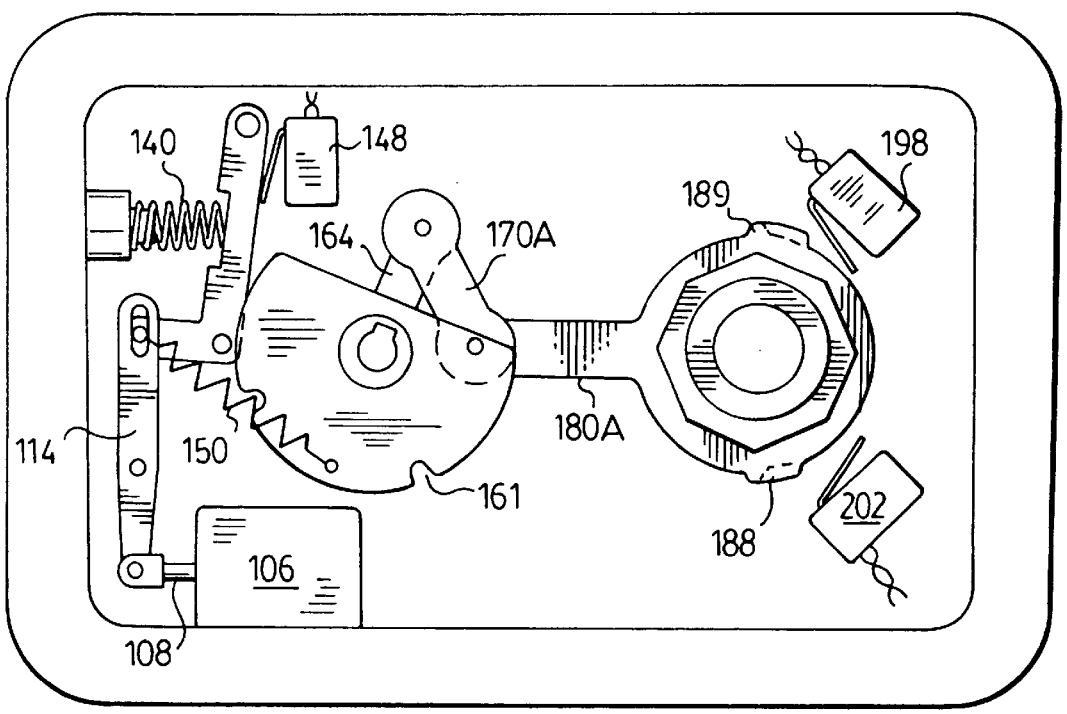
Figure 10:
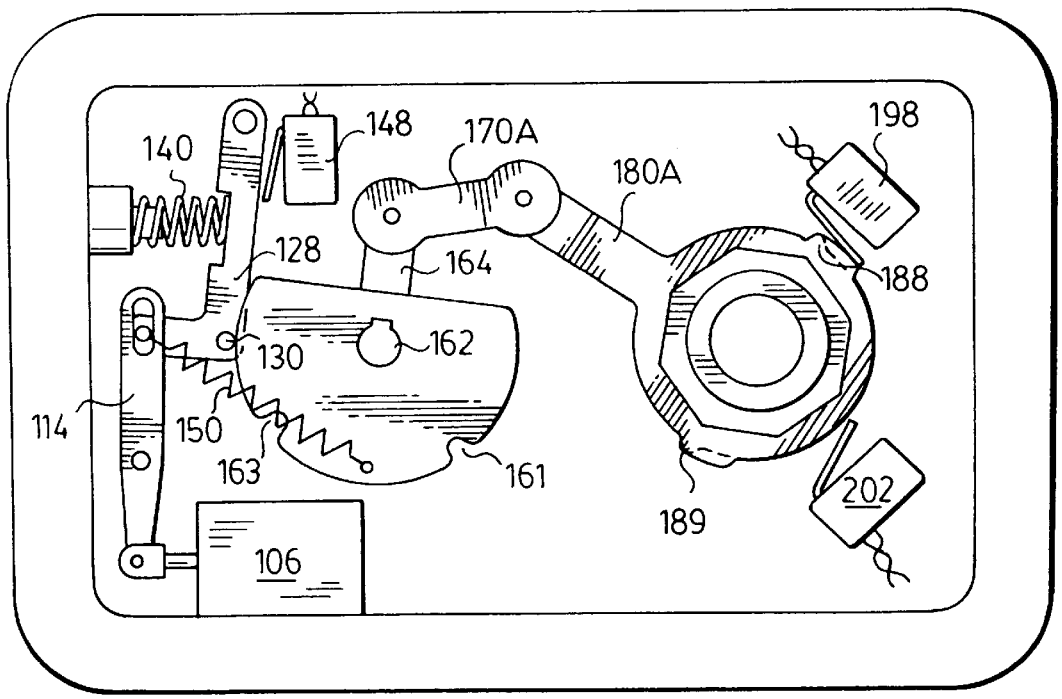
Figure 11:
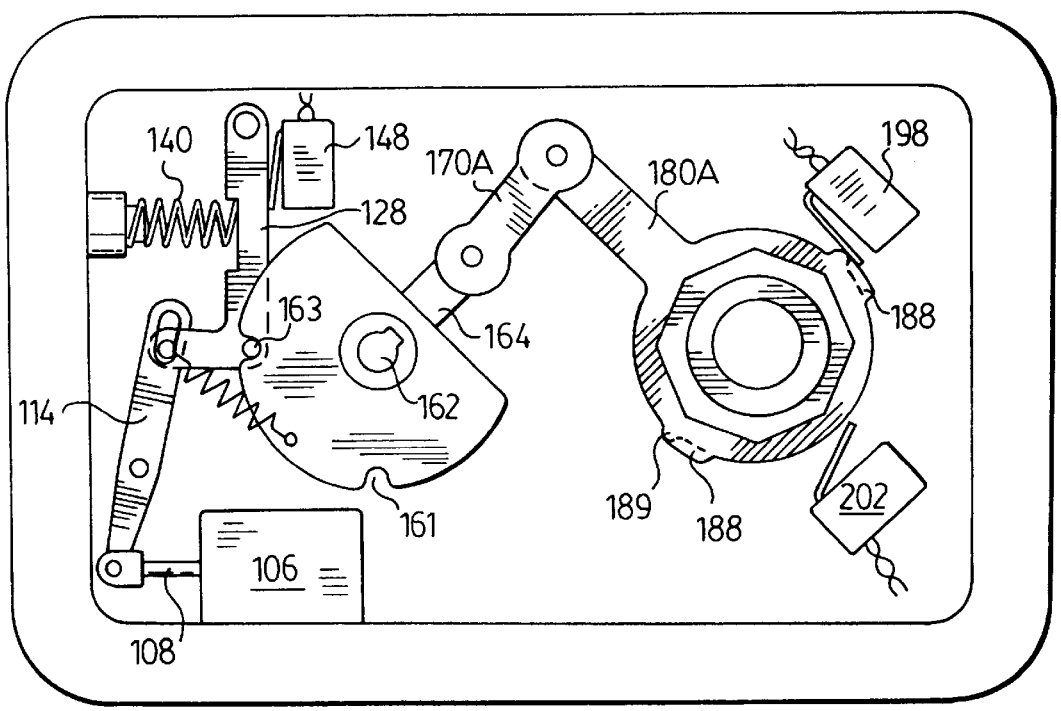

FIG. 8 shows the clutch when the drive unit (and the second arm 180) has rotated about 20°, and FIG. 9 shows the clutch at about 50° of rotation. FIG. 9 also illustrates another feature of the clutch 54 according to a preferred embodiment. As seen in FIG. 9, although the drive unit has rotated approximately 50°, the latch cam mechanism 160 has rotated about 120° (i.e. more than the necessary 90° for the turn sideways). The latch cam 160 begins to rotate in the other direction, as occurs in FIG. 10, when the drive unit has almost completed its 90° rotation. In this manner the engagement slot 163 first passes the pawl pin 130 and then backtracks to engage with pin 130 so that the clutch is locked in sideways mode (FIG. 11). Note that the solenoid must therefore remain energized only until pawl pin passes engagement slot 163 whereupon is may be deenergized and pawl pin 130 may travel along sector plate 158 to slot 163.

Preferably, the rotation of shaft 46 between the first and second positions comprises an initial segment of travel and a final segment of travel and clutch 54 further comprises a detector for detecting the degree of rotation of shaft 46 between the first and second positions and a controller for reducing the rate of rotation of the shaft during the final segment of travel of the shaft between the first and second positions. To this end, the cam lobes 188 on link 180A may act to trigger the mode identification switches 198 or 202 to indicate when the drive unit 20 has rotated to, eg., within 20° of its destination (either forwards or sideways). The switch 198 or 202 (depending on which mode is being entered) signals the control circuitry of the transportation device to reduce the speed of motors 36, 38 so that the operation of the change of direction of drive wheels 32, 33 is gentler and no abrupt "kick" or jolt occurs as the drive unit reaches the end of its rotation. The solenoid 106 may also be released once the last, eg. 20° of rotation have been reached, which allows the latch spring 140 to rotate the pawl pin 130 at the base of the locking lever 126 so that the pin rides against the latch cam 160 (i.e. the edge of sector plate 158). Therefore, as the rotation of the sector plate reverses or backtracks, pawl pin 130 will slide into slot 163.

The clutch preferably comprises two second arms 180A and 180B placed one on top of the other and essentially comprise two separate layers of sheet. Accordingly, each pair 198–200 and 202–204 of the mode identification switches are also stacked one on top of the other, such that one switch in each pair rides on the cam path of one of the second arm layers. Thus, the cam lobes 189 on link 180B may act to trigger the mode identification switches 200 and 204 which indicate which mode (forward or sideways) the clutch is operating in and also alert the control circuitry to stop the motors when the clutch has completely reached the forward or sideways position.

By including optional latch engagement switch 148, which is triggered by the position of arm 128 of locking lever 126, the user and the controller may be advised that the clutch is fully locked or engaged (in either the forwards or sideways mode).

Figure 12:
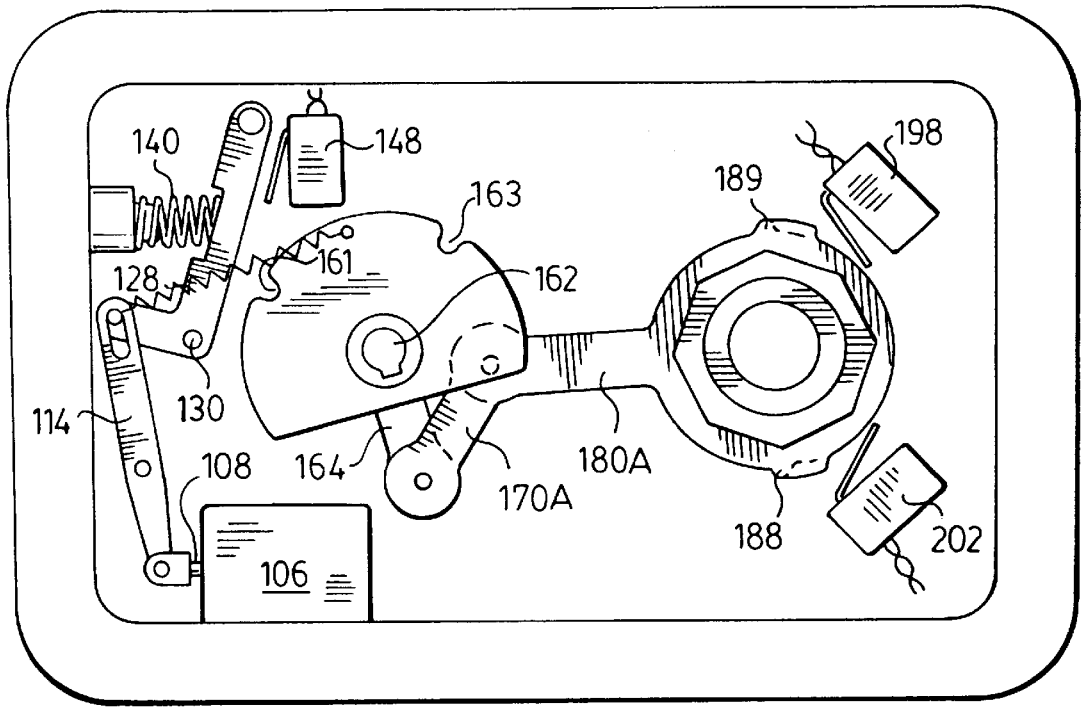
FIGS. 12–13 similarly show the clutch of FIG. 4 at various stages as the clutch changes from sideways mode back to forward mode.
Figure 13:
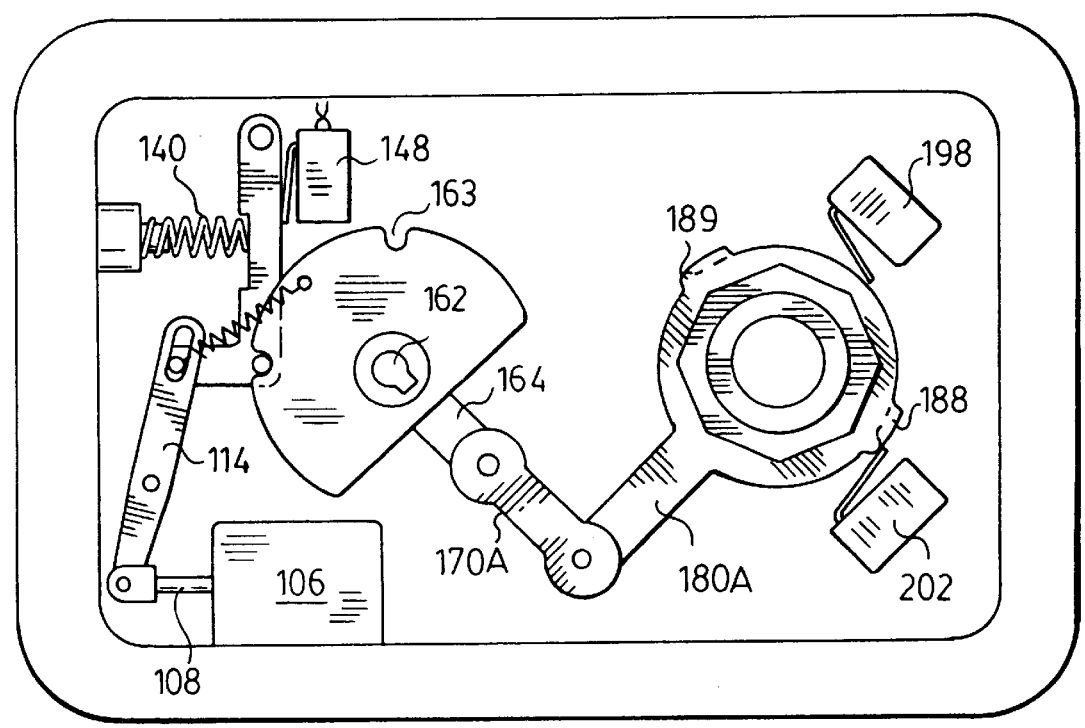

FIGS. 12 and 13 similarly illustrate stages as the clutch 54 changes from the sideways position to the forward position. This change back to forward mode is again initiated by energizing the solenoid causing the pawl pin 130 to pull out of the engagement slot 163 and subsequently the latch cam to rotate in a clockwise direction (as seen in FIG. 12). The description of the movement is FIGS. 12 and 13 is therefore very similar to that just given for FIGS. 6–11 and so is not repeated for the sake of brevity.

As shown in FIGS. 6 and 11, which illustrate the clutch in the locked forward and sideways modes respectively, the arms 164 which is rigidly attached to the latch cam and the link 170 are directly in line. This configuration is very advantageous since it provides essentially an infinite resistance against rotation of shaft 46, i.e. the arms 164 and 170 must change position before the drive unit 20 can rotate independently of the transportation device 10.

Another advantage of the clutch mechanism 54 of the present invention is that this infinite resistance is provided without applying any significant load or force to the pawl pin 130 (the latch spring 140 being extremely light). As a result, the clutch can be disengaged or unlocked by applying power to a relatively small solenoid for only a brief period of time. This is extremely energy efficient and conserves battery life. Moreover, the rotation of the drive unit can be achieved by means of only two drive motors on the transportation device 10, without the need for additional motors.

Furthermore, there is very minimal rotation of the drive unit at the beginning of any transition from one mode to another, because there is very little resistance to the initial deflection of the arm 164 and link member 170 out of alignment. This leads to the further advantage, in the present invention, of being able to use a light bias spring 150.

Referring back to FIG. 1, a control unit 30 on device 10 can be used to control drive unit 20 and clutch 54. Control unit can be located at any appropriate position on transportation device 10. Further, while a manual or hand operated control unit is shown in FIG. 1, other control units, e.g. voice activated, are also contemplated to be used with the present invention.

The control unit 30 may also be used as an output device. For instance, the control circuitry may use the confirmation provided by the state of the latch engagement switch 148 to inform a user of the transportation device 10 that a change of clutch mode operation was successfully completed. This can be done by, for example, illuminating an appropriate indicator lamp on the control unit 30. Similarly, the mode of operation which the clutch is currently in can be relayed to the user based on the status of the mode identification switches. Alternatively, a separate status unit may be used to provide these indications to the user.

Figure 14:
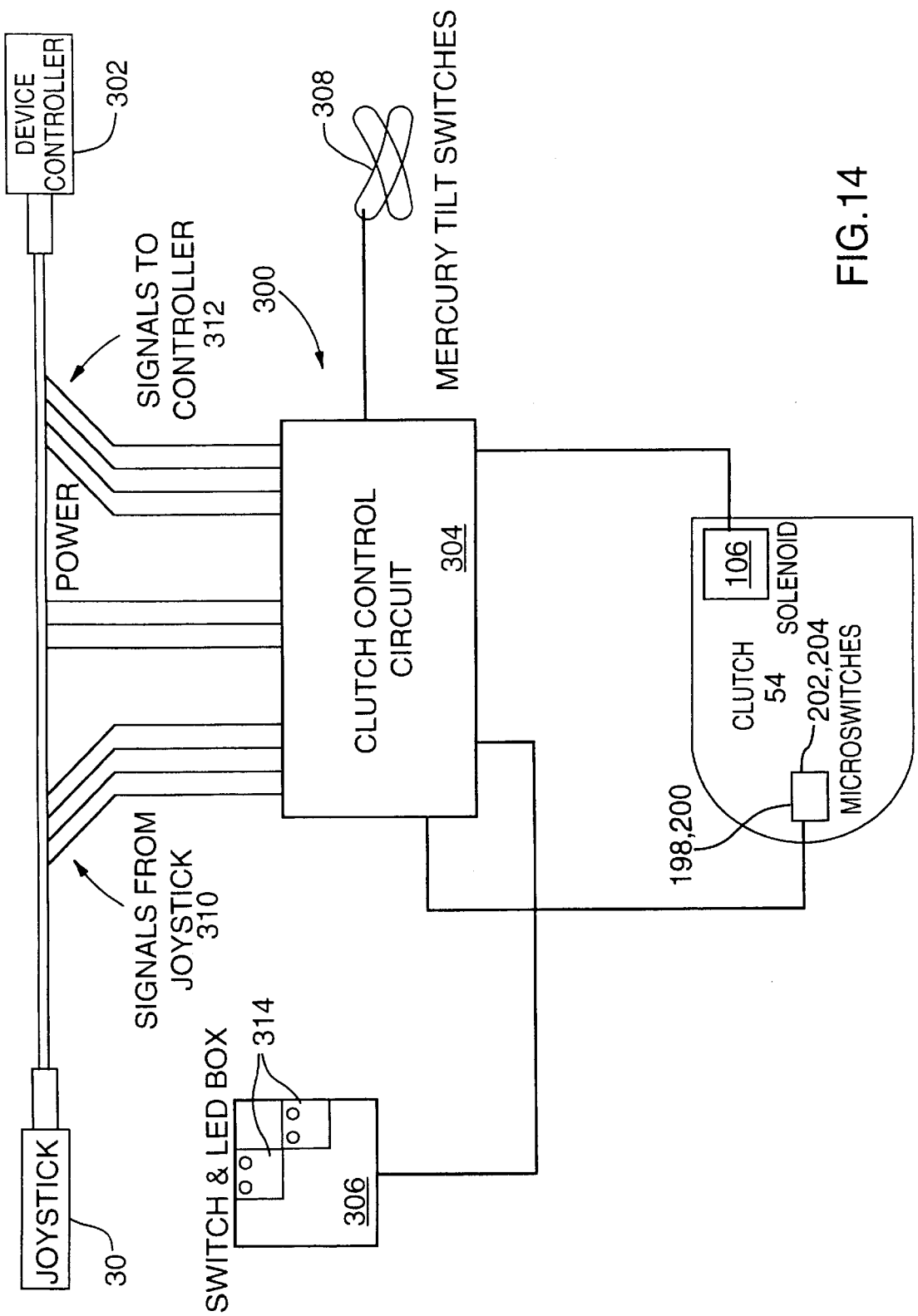
FIG. 14 is a system block diagram for the control circuitry of a motorized transportation device having a clutch according to the present invention.

FIG. 14 shows a system block diagram for a control circuitry 300 of a motorized transportation device in accordance with a preferred embodiment of the present invention.

Signals JOYSTICK A, JOYSTICK B, SPEED, and RESPONSE (acceleration) 310 from a joystick control unit are processed in known manner by a device controller circuit 302. The device controller operates motors 36 and 38 to control drive wheels 32, 33 to produce the desired direction and speed of movement of the transportation device 10. Referring to FIG. 14, in normal or forward operation, all joystick inputs 310 are transmitted without alteration through the clutch control circuit 304 to the device controller 302. When the drive unit 20 is required to rotate in response to an input from the switch & LED unit 306 (i.e. the clutch is disengaged), the inputs from the joystick are disabled, and all speed and directional inputs to the device controller 302 originate from the clutch control circuit 304. In addition, when the transportation device is in the lateral or sideways movement mode, the clutch control circuit 304 also modifies the joystick inputs so as to rotate the directional axes and to preferably limit speeds (eg. to about 50%) when the drive wheels are in a direction other than forward mode (eg. sideways mode).

Figure 15:
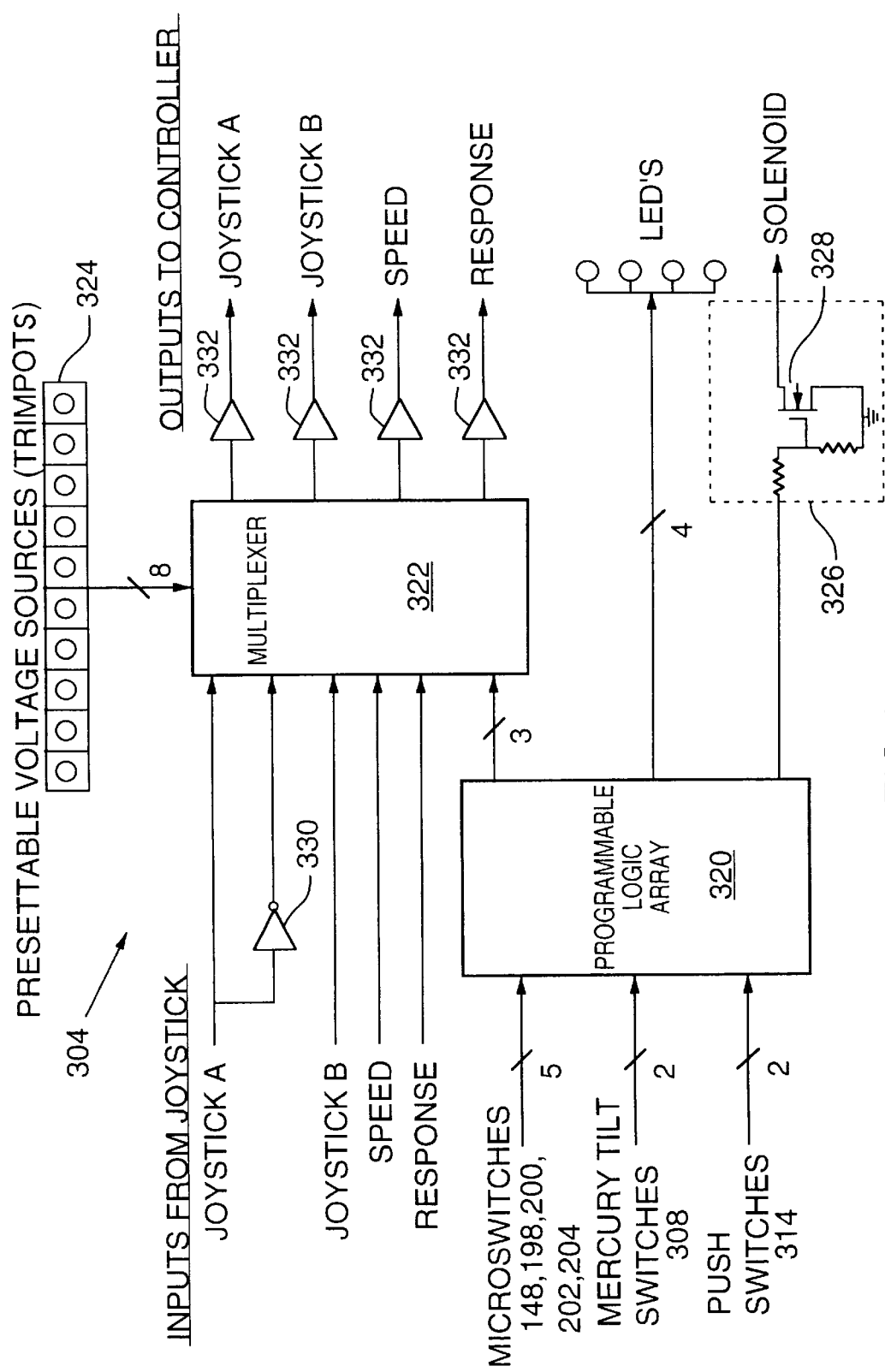
FIG. 15 is a more detailed block diagram of the clutch control circuitry.

In a preferred embodiment and as shown in FIG. 15, the clutch control circuit 304 comprises a logic array 320, an analog multiplexer 322, a pre-settable voltage source or trimpot bank 324, and solenoid control circuitry 326. The clutch control circuit 304 may also comprise its own power supply regulator (not shown). The logic array 320 preferably comprises a programmable logic array (PLA) such as the PALCE22V10 from Lattice Semiconductor, although other PLAs may also be used. In known manner, the PLA is programmed with a program written in a hardware description language, such as CUPL. The multiplexer 322 may be implemented using two 74HC4051 and one 74HC4052 high speed CMOS logic chips.

The logic array 320 receives inputs from: the mode identification microswitches (198, 200, 202, 204) and the latch engagement switch 148 shown in FIG. 4; the manually operated keypad switches 314 from switch and LED unit 306 (which may be located near joystick control unit 30); and the mercury tilt-sensing switches 308. As shown in detail in FIG. 16, the logic array 320 performs all the necessary decoding required to control and drive the status LEDs on unit 306 (for example, in response to the state of the latch engagement switch 148 a LED may be controlled to indicate whether or not a mode switching operation is complete and whether the device may be moved again), the solenoid 106, and the analog multiplexer 322. The multiplexer 322 provides either the speed and response inputs of the joystick or the appropriate trimpot inputs to the device controller 302.

The trimpots 324 are set to produce appropriate speed and direction inputs to control the rotation of the drive unit when the clutch is disengaged. It is understood that the trimpot inputs may be connected as voltage dividers to produce a range of signals similar to the JOYSTICK A and B, SPEED, and RESPONSE user inputs. As shown in FIG. 15, the solenoid control circuitry 326 may comprise a MOSFET switching transistor 328 designed for inductive loads, such as the IRLD024 from International Rectifier, which can be driven directly from the appropriate output of the logic array, as shown in FIG. 15.

One of the inputs from the joystick must be inverted to provide appropriate directional control when the wheelchair is operational in sideways or lateral mode. This rotates the directional axes by 90° so that directional commands from the joystick control unit 30 still correspond to the orientation of the transportation device (and typically also to the orientation of a user of the device, e.g. a human being in a wheelchair) and not the orientation of the drive unit. This can be accomplished by means of the inverter 330 as shown in FIG. 15, which provides the necessary inversion to the JOYSTICK A input to the multiplexer. The outputs from the multiplexer are also buffered (by means of buffers 332) before being passed to the device controller 302.

Figure 16:
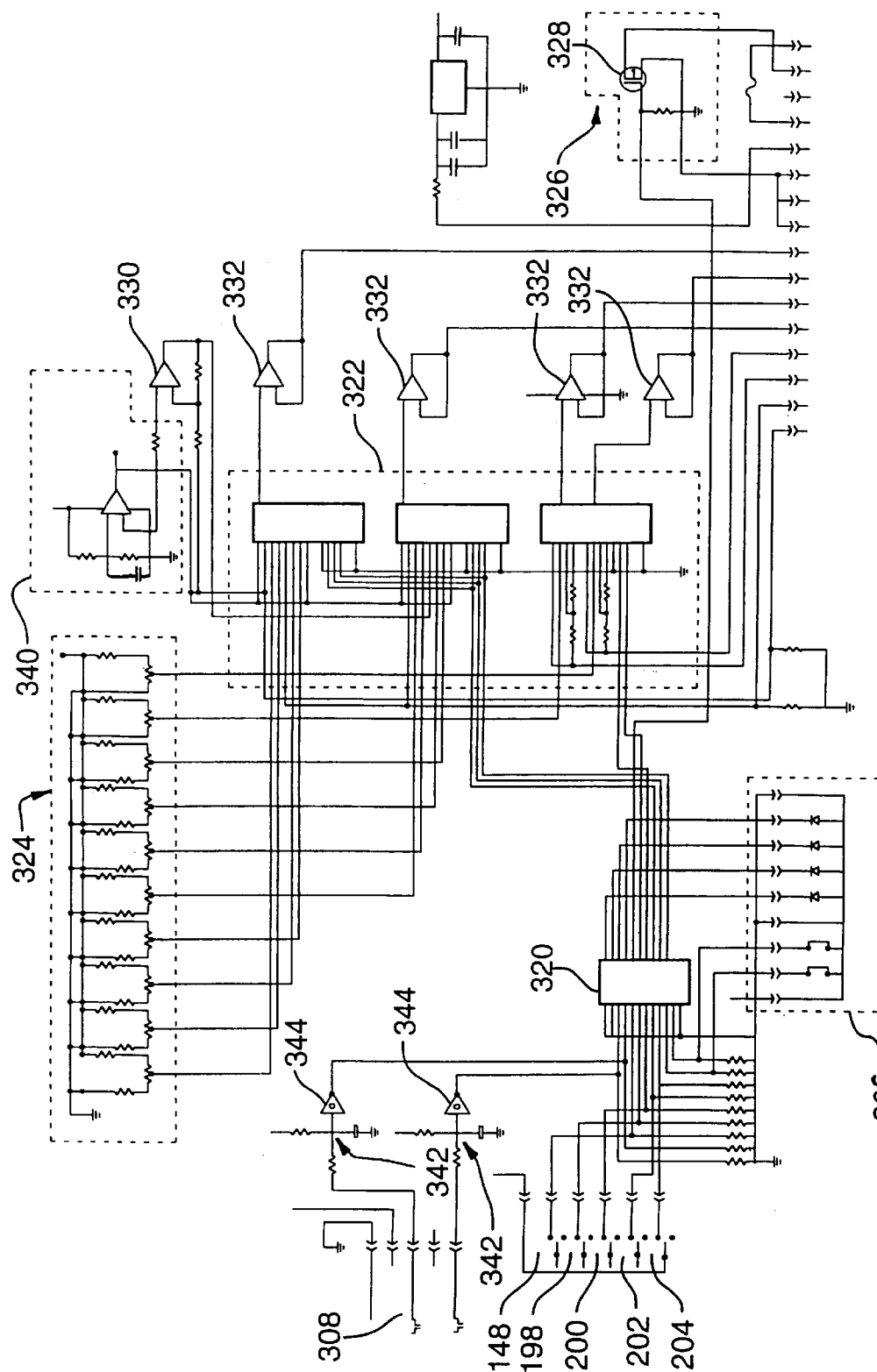
FIG. 16 is a detailed circuit schematic of the clutch control circuitry.

FIG. 16 shows a detailed implementation of a preferred embodiment of the clutch control circuit 304 of the present invention. In addition to the elements previously described and indicated with similar reference numbers as above, FIG. 16 also shows a "virtual ground" circuit 340 which provides an appropriate biasing to the inverter 330 and also provides or introduces a zero reference to the wheelchair controller during conditions when the motors are stationary. Also, as shown in FIG. 16, the inputs from the mercury tilt switches are each fed through a simple resistor-capacitor low pass circuit 342 (having a time constant of approximately 1 second) and a Schmitt trigger circuit 344 to provide a reliable input to the logic array 320.

The clutch control circuit of the present invention may also add certain safety precautions to the operation of the transportation device. For instance, if rotation of the drive wheels ceases in the middle of a change from forwards mode to sideways mode or vice-versa, the drive unit 20 may be disabled, so that the device 10 can only be operated when the clutch is in one of the two locked positions. Additionally, the mercury tilt switches 308 can serve to identify situations when the transportation device tips more than some maximum number of degrees (e.g. 6°) from the vertical. If this occurs when the clutch of the device is in sideways mode, the drive unit can also be rendered inoperative to ensure safety. Alternatively, when this occurs, the clutch control circuit can ensure that only forward or backward movement of the device is permitted, so that the transportation device can be removed from an unsafe position.

While preferred embodiments of the present invention have been described, the embodiments disclosed are illustrative and not restrictive, and the scope of the invention is intended to be defined only by the appended claims.

We claim:

1. A clutch for altering the direction of a drive unit of a transportation device between a first direction of travel and a second direction of travel, the drive unit having at least one drive wheel connected to a shaft, the shaft being rotatably mounted with respect to the transportation device between at least a first position, corresponding to the first direction of travel, and a second position, corresponding to the second direction of travel, the clutch comprising:
   (a) a lock having a first preset locked position corresponding to the first direction of travel and a second preset locked position corresponding to the second direction of travel; and,
   (b) a connecting member connected to the shaft and drivingly linked to the lock by a linking arm for alternately locking the shaft in one of the directions of travel, the connecting member is configured such that when the lock is in one of the preset positions, the connecting member is at about 90° to the linking arm.

2. The clutch as claimed in claim 1 wherein the shaft extends vertically and the clutch further comprises a housing which is adapted to rotatably receive a portion of the shaft therein.

3. The clutch as claimed in claim 1 wherein the connecting member is drivenly connected to the shaft whereby rotation of the shaft between the first and second directions of travel when the lock is not lockingly engaged in one of the preset locked positions causes the lock to move between the first and second locked positions.

4. The clutch as claimed in claim 1 further comprising an actuator for disengaging the lock from the first and the second locked positions.

5. The clutch as claimed in claim 1, wherein the rotation of the shaft between the first and second positions comprises an initial segment of travel and a final segment of travel and the clutch further comprises a detector for detecting the degree of rotation of the shaft between the first and second positions and a controller for reducing the rate of rotation of the shaft during the final segment of travel of the shaft between the first and second positions.

6. A base for receiving a support surface comprising:
   (a) a longitudinally extending chassis having a front end, a rear end and a central portion positioned there between;
   (b) at least one drive wheel mounted on the central portion to engage the support surface on which the base is positioned, the at least one drive wheel is rotatably mounted to the central portion by a shaft;
   (c) a plurality of rotatably mounted wheels positioned around the chassis and mounted below the chassis to engage the surface on which the base is positioned; and,
   (d) a clutch including a lock operable to selectively lock the at least one drive wheel in at least a first preset position corresponding to a first direction of travel and a second preset position corresponding to a second direction of travel, the clutch includes a longitudinally extending first arm member having a longitudinal axis, the first arm member is configured such that a rotational force exerted on the shaft when the lock is in one of the preset positions is transmitted to the lock essentially along the longitudinal axis of the first arm member.

7. The base as claimed in claim 6 further comprising at least two drive wheels and wherein the connecting member is drivenly connected to the shaft whereby rotation of the drive wheels in opposed directions when the lock is not locked in one of the preset locked positions causes the drive wheels to move between the first and second directions of travel.

8. The base as claimed in claim 7 further comprising an actuator for disengaging the lock from the first and the second locked positions.

9. The base as claimed in claim 6 wherein the rotation of the at least one drive wheel between the first and second directions of travel comprises an initial segment of travel and a final segment of travel and the clutch further comprises a detector for detecting the degree of rotation of the at least one drive wheel between the first and second directions of travel and a controller for reducing the rate of rotation of the at least one drive wheel during the final segment of travel of the at least one drive wheel between the first and second directions of travel.

10. The base as claimed in claim 6 further comprising an actuator for automatically engaging and disengaging the lock from the preset locked positions as the at least one drive wheel moves between the first and second directions of travel.

11. The base as claimed in claim 6 wherein the first direction of travel is forwards and the seconds direction of travel is sideways and the base includes a controller for limiting the speed of the base when the drive wheels are in the second direction of travel.

12. The base as claimed in claim 6 wherein the first direction of travel is forwards and the second direction of travel is sideways and the base further comprises a tilt sensor for detecting the degree of rotation of the base from the horizontal and a limiter to prevent the drive wheels moving to the second direction or to prevent the at least one drive wheel from moving the base when the tilt sensor detects that the base is at an angle greater than a preset angle.

13. The base as claimed in claim 6 wherein the lock comprises a cam member and the first arm is non-rotatably mounted to the cam member and a second arm is non-rotatably mounted to the shaft and the first and second arms are pivotally connected together.

14. The base as claimed in claim 13 further comprising a link member pivotally connected to both the first arm and the second arm and, when the lock is in the first and the second preset locked positions, the first arm and the link extend in a substantially straight line.

15. The base as claimed in claim 13 wherein the cam member comprises a first engagement member corresponding to each of the preset locked positions and the lock comprises a second engagement member lockingly engagable with each of the first engagement members, the second engagement member moveable out of engagement with each first engagement member essentially without any frictional contact between the second engagement member and the cam member.

16. The base as claimed in claim 15 further comprising a solenoid for moving the second engagement member out of engagement with the first engagement members.

17. The base as claimed in claim 15 further comprising a biasing member for biasing the second engagement member into engagement with the first engagement member.

18. The base as claimed in claim 6 further comprising a joystick for actuating the movement of the at least one drive wheel between the first and second directions of travel.

19. The base as claimed in claim 6 further comprising a indicator for indicating engagement of the lock in a preset locked position.

20. A method for altering the direction of a drive unit of a transportation device between a first direction of travel and a second direction of travel, the drive unit having a clutch, at least one drive wheel connected and a shaft extending vertically between the at least one drive wheel and the clutch, the shaft being rotatably mounted with respect to the transportation device between a plurality of positions each corresponding to the different direction of travel, the clutch operable to selectively lock the at least one drive wheel in a preset locked position corresponding to a direction of travel, the method comprising:
   (a) disengaging the clutch from a preset locked position in which an arm member connected to the clutch is positioned to be aligned with a force exerted on the arm member by the shaft due to an external rotational force applied to the shaft;
   (b) accelerating the shaft to rotate the shaft between a first position and a second position;
   (c) decelerating the shaft prior to the shaft moving to the second position such that the termination of rotation of the shaft at the second position does not jar the transportation device; and,
   (d) engaging the clutch in the respective preset locked position in which the arm member connected to the clutch is also positioned to be aligned with a force exerted on the arm member by the shaft due to an external rotational force applied to the shaft.

21. The method as claimed in claim 20 wherein the drive unit comprises at least two drive wheels and the method further comprises causing the drive wheels to rotate in opposite direction to rotate the shaft between the first and second positions.

22. The method as claimed in claim 20 further comprising detecting the degree of rotation of the shaft when the shaft has rotated a preset amount between the first and second positions and decelerating the shaft once it has rotated the preset amount.

23. The method as claimed in claim 20 further comprising detecting the completion of the rotation of the shaft between the first and second positions and signalling a user to confirm completion of the rotation of the shaft.

24. The method as claimed in claim 20 wherein the first direction of travel is forwards and the seconds direction of travel is sideways and the method further comprises limiting the speed of the base when the drive wheels are in the second direction of travel.

25. The method as claimed in claim 20 wherein the first direction of travel is forwards and the second direction of travel is sideways and the method further comprises detecting the degree of rotation of the base from the horizontal and preventing the drive wheels moving to the second position or preventing the at least one drive wheel from moving the base when the degree of rotation of the base from the horizontal is greater than a preset angle.

26. A base for receiving a support surface comprising:
 (a) a longitudinally extending chassis having a front end, a rear end and a central portion positioned there between;
 (b) at least one drive wheel to engage the surface on which the base is positioned, the at least one drive wheel is rotatably mounted to the central portion by a shaft, a second arm is non-rotatably mounted to the shaft;
 (c) a plurality of rotatably mounted wheels positioned around the chassis and mounted below the chassis to engage the surface on which the base is positioned;
 (d) a clutch having a cam member to selectively lock the at least one drive wheel in at least a first preset position corresponding to a first direction of travel and a second preset position corresponding to a second direction of travel, the clutch including a first arm non-rotatably mounted to the cam member; and,
 (e) a link member pivotally connected to both the first arm and the second arm and, when the cam member is in the first and the second preset locked positions, the first member and the link extend in a substantially straight line.

27. A base for receiving a support surface comprising:
 (a) a longitudinally extending chassis having a front end, a rear end and a central portion positioned there between;
 (b) at least one drive wheel to engage the surface on which the base is positioned, the at least one drive wheel is rotatably mounted to the central portion by a shaft, a second arm is non-rotatably mounted to the shaft;
 (c) a plurality of rotatably mounted wheels positioned around the chassis and mounted below the chassis to engage the surface on which the base is positioned; and,
 (d) a clutch to selectively lock the at least one drive wheel in at least a first preset position corresponding to a first direction of travel and a second preset position corresponding to a second direction of travel, the clutch including a first arm nonrotatably mounted to the cam member, the clutch comprising a cam member having a first engagement member corresponding to each of the preset locked positions and a second engagement member lockingly engagable with each of the first engagement members, the second engagement member moveable out of engagement with each first engagement member essentially without any frictional contact between the second engagement member and the cam member.

* * * * *